United States Patent [19]
Meier

[11] 3,774,310
[45] Nov. 27, 1973

[54] FEELER FOR LINEAR GAUGE

[76] Inventor: Johann Meier, Brione Sopra Minusio, Switzerland

[22] Filed: Sept. 14, 1971

[21] Appl. No.: 180,418

[52] U.S. Cl. ............................ 33/169 R, 33/23 K
[51] Int. Cl. ........................................... G01b 5/25
[58] Field of Search ................... 33/169 C, 172 B, 33/23 K, 174 P, 174 L, 169 R, 172 R, 170; 90/62

[56] References Cited
UNITED STATES PATENTS
3,512,261   5/1970   Viollet ............................. 33/169 C
FOREIGN PATENTS OR APPLICATIONS
649,391   1/1951   Great Britain ................... 33/172 B Primary Examiner—Harry N. Haroian
Attorney—Pierce, Scheffler & Parker

[57] ABSTRACT

In a linear gauge having a feeler head, a feeler clamping part and an intermediate piece between the same, the cross-section of said intermediate piece is such that the feeling surface of the feeler head is pivotable in at least one direction with respect to the longitudinal axis of the feeler. The feeler clamping part includes clamping means adapted to adjust and fix the feeler head in a specific attitude with respect to the longitudinal axis of the feeler.

4 Claims, 6 Drawing Figures

Patented Nov. 27, 1973

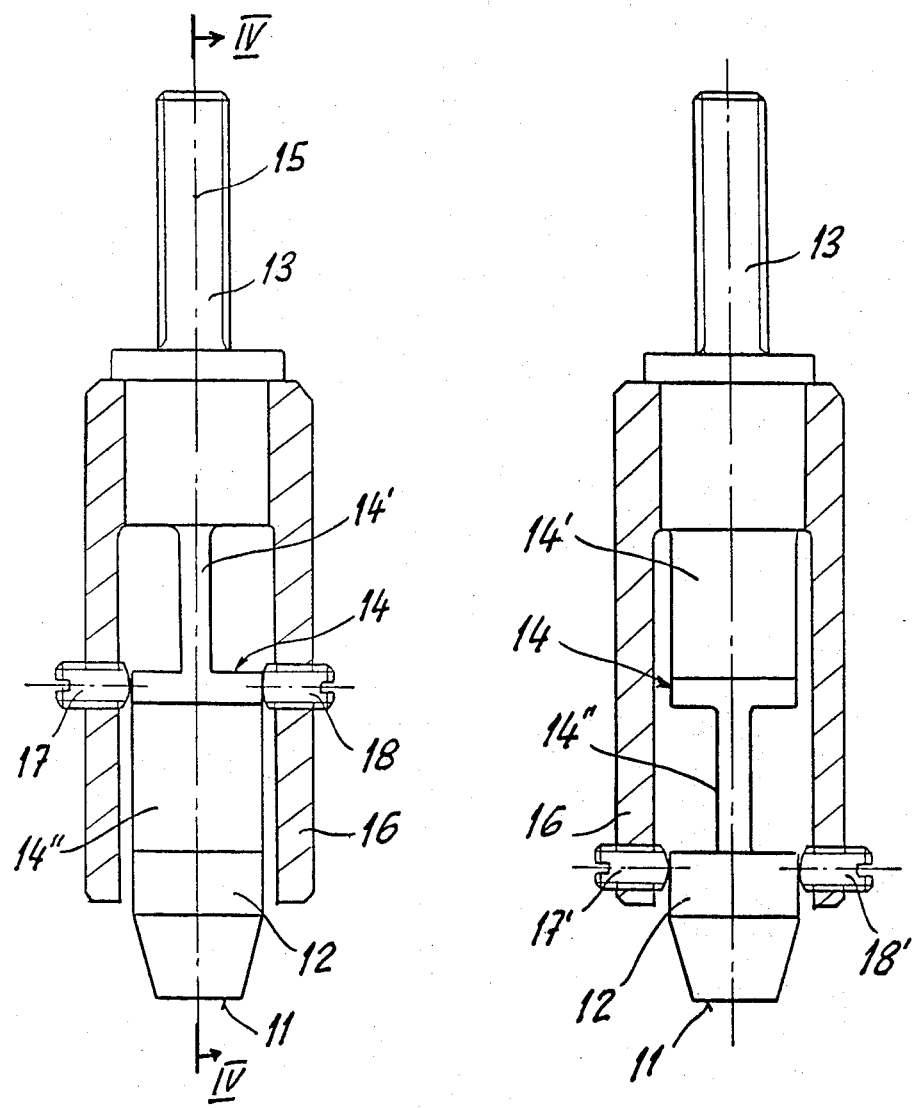

FEELER FOR LINEAR GAUGE

The present invention relates to a feeler for a linear gauge.

The known feelers for linear gauges have the disadvantage that if their feeling surface is not oriented quite precisely parallel to the plane table surface or to a measured object support surface, it is extremely difficult or even impossible to align it precisely thereon.

A feeler provided with a clampable articulation is already known, which however has the disadvantage that it is relatively complicated in its construction and is adjustable in only one direction — i.e., is suitable for use only for feelers which are provided with a knife edge. Furthermore the manufacture of the said articulation is comparatively expensive.

A feeler provided with a ball joint is also already known, which however has the disadvantage that it is extremely difficult to adjust the feeling surface with high precision.

It is the object of the invention to produce a feeler which is free from these disadvantages.

The feeler according to the invention is characterised by the fact that the intermediate piece located between the feeler head and the feeler clamping part has such a cross section that the feeling surface of the feeler head is pivotable at least in one direction with respect to the feeler longitudinal axis and that adjusting means firmly attached directly or indirectly to the feeler clamping part are provided in order to adjust the feeler head into a specific attitude with respect to the feeler longitudinal axis and to maintain it in that attitude.

It is convenient that, considered in the direction of the feeler longitudinal axis, the cross section of the intermediate piece is rectangular or oval, and the minor axis of the cross sectional profile is oriented parallel to the pivoting direction of the feeler head, and that the intermediate piece is surrounded by a sleeve firmly attached directly or indirectly to the feeler clamping part, in which in the pivoting direction of the feeler head, adjusting screws are provided one at each of the two mutually opposite sleeve wall points, for adjusting the feeler head into a specific relative attitude with respect to the feeler longitudinal axis and for fixing the feeler head in that attitude.

In order to adjust the feeler in two directions oriented mutually at right angles it is advantageous if, considered in the direction of the feeler longitudinal axis, the cross section of the intermediate piece is rectangular or oval and the minor axis of the cross sectional profile is oriented at first, in a first section, parallel to a first pivoting direction, and then in a second following section, parallel to a second pivoting direction of the feeler head oriented at right angles to the first pivoting direction, and that the intermediate piece is surrounded by a sleeve firmly attached directly or indirectly to the feeler clamping part, in which, in the terminal region of both the first and second sections of the intermediate piece, confronting the feeler head in each case, adjusting screws are provided, in the appropriate pivoting direction, one at each of the two mutually opposite sleeve wall parts, for fixing the feeler head in the corresponding pivoting direction.

The invention is described herebelow in exemplary manner with reference to the drawing, wherein:

FIG. 3 shows a longitudinal section throgh a feeler alignable in two directions mutually at right angles;

FIG. 4 shows a section along the line IV—IV in FIG. 3;

Figure 1:
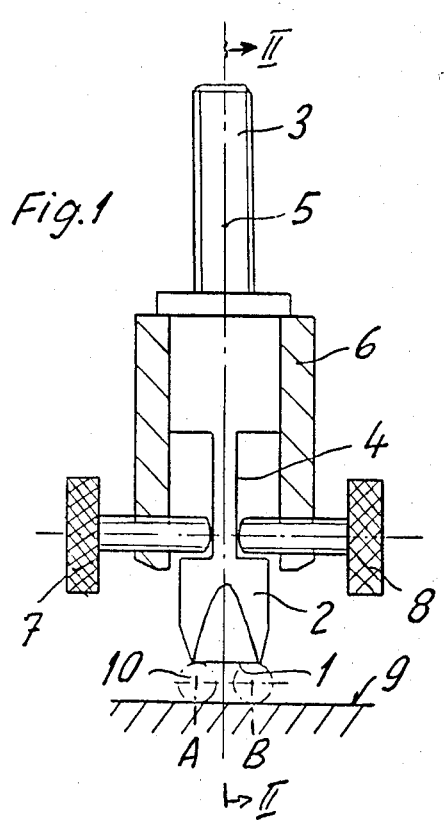
FIG. 1 shows a longitudinal section through a feeler provided with a knife edge.
Figure 2:
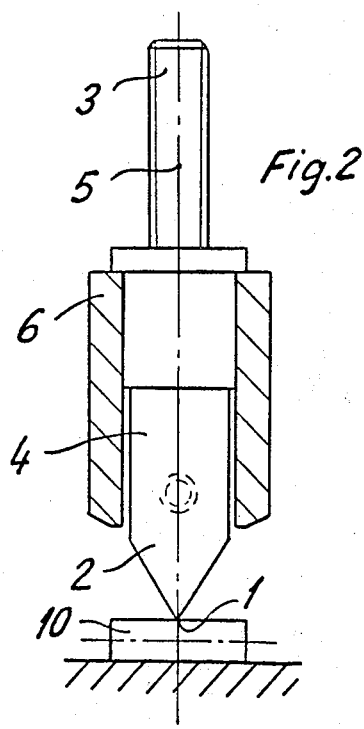
FIG. 2 shows a section along the line II—II in FIG. 1.

FIGS. 1 and 2 illustrate a feeler provided with a knife edge 1. Because the feeling surface constituted by the knife edge 1 in FIG. 1 is very narrow as measured in the direction at right angles to the plane of the drawing, it is only necessary for the feeler head 2 to be pivotable in one direction, for which purpose the intermediate piece 4 located between the feeler head 2 and the feeler clamping part 3 is appropriately constructed.

As FIGS. 1 and 2 show, as viewed in the direction of the feeler longitudinal axis 5, the cross section of the intermediate piece 4 is rectangular and the minor axis of the cross sectional profile is oriented parallel to the pivoting direction of the feeler head 2, so that the latter is adjustable only in the pivoting direction, because the moment of resistance of the cross sectional area of the intermediate piece 4 is too great in the other direction.

The intermediate piece 4 is surrounded by a sleeve 6 firmly attached by a press fit to the feeler clamping part 3, in which, in the pivoting direction of the feeler head 2, adjusting screws 7 and 8 are provided one at each of the two mutually opposite sleeve wall parts, for adjusting the feeler head 2 into a specific relative attitude with respect to the feeler longitudinal axis 5 and for fixing the feeler head in that attitude.

The precise alignment of the knife edge 1 with respect to a plane table surface 9 can be verified e.g. by introducing an accurate gauge pin 10, as FIG. 1 shows, firstly at the point A between the one end of the knife edge 1 and the plane table surface 9, and secondly between the other end of the knife edge 1 and the plane table surface 9.

If the feeling surface of the feeler head is conformed as a circular plane surface 11, as illustrated in FIGS. 3 and 4, then a pivoting of the feeler head in a single direction is no longer sufficient; in this case, as illustrated in these two Figures, it is necessary for the feeler head 12 to be pivotable in two straight lines oriented mutually at right angles in a plane oriented at right angles on the feeler longitudinal axis 15.

In order to achieve this, as viewed in the direction of the feeler longitudinal axis 15, the cross section of the intermediate piece 14 is rectangular and the minor axis of the cross sectional profile is oriented at first, in a first section 14', parallel to a first pivoting direction, and then in a second following section 14'', parallel to a second pivoting direction of the feeler head 12 oriented at right angles to the first pivoting direction.

The intermediate piece 14 is surrounded by a sleeve 16 firmly attached by a press fit to the feeler clamping part 13, in which, in the terminal region of each of the first and second sections 14' and 14'' of the intermediate piece 14 confronting the feeler head 12, adjusting screws 17, 18 and 17', 18' are provided in the appropriate pivoting direction at each of the two mutually opposite sleeve wall parts for the purpose of adjusting and fixing the feeler head 12 in the appropriate pivoting direction.

Now if it is required to align the feeling surface 11 precisely parallel to a plane table surface, then the two lower adjusting screws 17' and 18' are released and the feeling surface is aligned precisely in the first direction by means of the two upper adjusting screws 17 and 18. When this adjustment is complete, the feeling surface 11 is then aligned precisely in the second direction oriented at right angles to the first direction, by means of the two lower adjusting screws 17' and 18'.

Because the intermediate piece sections 14' and 14", by virtue of their rectangular cross section, have a high moment of resistance each in a direction oriented at right angles to the pivoting direction, and consequently each intermediate piece section is deflectable only in the pivoting direction, a rapid and accurate adjustment of the feeler head 12 is possible.

Figure 5:
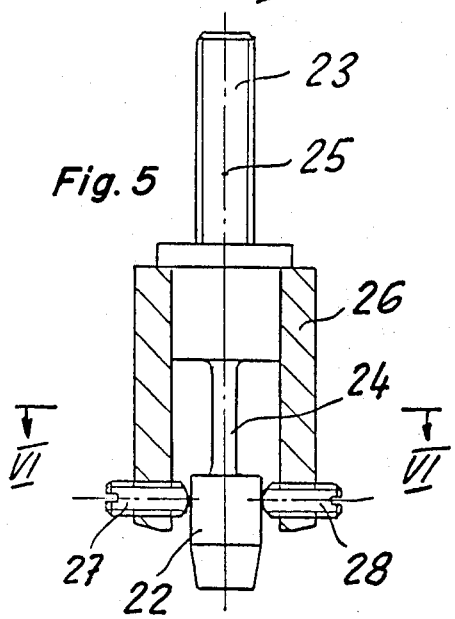
FIG. 5 shows a longitudinal section through a further embodiment of an adjustable feeler and FIG. 6 shows a section along the line VI—VI in FIG. 5.
Figure 6:
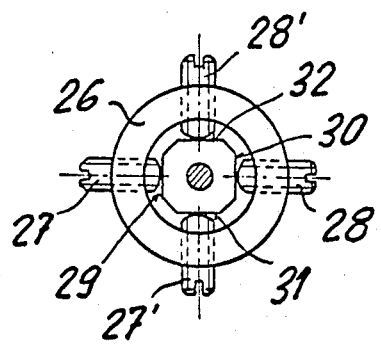

FIGS. 5 and 6 illustrate a feeler in which the intermediate piece 24 is of rod shaped conformation. In order to align the feeler head 22, and hence the feeling surface 21, in two directions oriented mutually at right angles, two mutually associated adjusting screws 27, 28 and 27', 28' are used in each case, which each respectively abut a plane surface 29, 30 and 31, 32 of the feeler head 22.

I claim:

1. Feeler for a linear measuring device, which comprises a feeler head having a feeling portion which fits snugly to a plane surface;

a feeler clamping means; an intermediate piece disposed between the feeler head and said clamping means, said intermediate piece having at least in part a sectional area possessing a low moment of resistance;

a sleeve surrounding said intermediate piece, said sleeve being fixedly connected with said feeler clamping means; and means for adjusting the feeler head to take up a specific relative position versus the longitudinal axis of the feeler and for locking the feeler head in this position, said adjusting and locking means consisting essentially of a pair of set screws, for swiveling the feeler head, placed at two opposing points of the sleeve wall and fitting snugly to both sides of a portion of said intermediate piece facing the feeler head and pointing in the direction of the low moment of resistance.

2. Feeler according to claim 1, wherein the feeler head is swivelable within a plane located vertically with respect to the longitudinal axis of the feeler and along two straight lines which are vertical to each other, the cross-sectional profile with low moment of resistance extending with a first section thereof initially parallel to a first swiveling direction, and thereupon with a second, subsequent section parallel to a second swiveling direction of the feeler head which second section runs vertically to the first swiveling direction.

3. Feeler according to claim 1, wherein the sectional area of the intermediate piece is rectangular.

4. Feeler according to claim 1, wherein the intermediate piece is rod-shaped.

* * * * *